Figure 1:
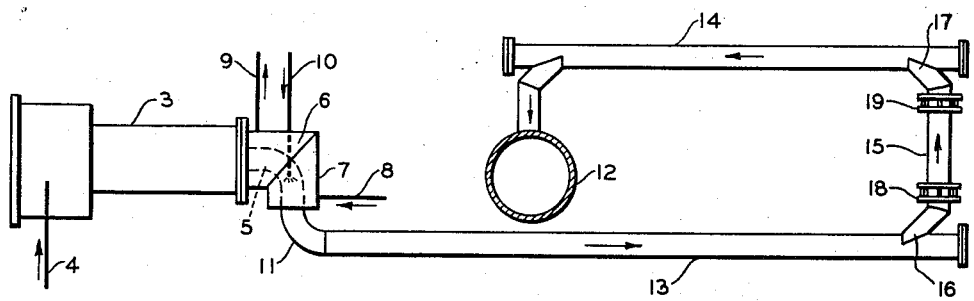

Oct. 12, 1954

P. B. MILAM 2,691,539

FLEXIBLE JOINT FOR PIPES

Filed Jan. 4, 1950

INVENTOR.
P.B. MILAM
BY Hudson & Young
ATTORNEYS

Patented Oct. 12, 1954

2,691,539

UNITED STATES PATENT OFFICE 2,691,539

FLEXIBLE JOINT FOR PIPE

Paul B. Milam, Bartlesville, Okla., assignor to Phillips Petroleum Company, a corporation of Delaware Application January 4, 1950, Serial No. 136,737

4 Claims. (Cl. 285—196)

This invention relates to a conduit expansion system and to a deflection joint particularly adapted for use in such a system. In one of its aspects, this invention relates to a deflection joint adapted to be inserted in a length of pipe to permit lateral displacement or deflection of the pipe along its longitudinal axis.

Many manufacturing processes employ conduits to transport cold or hot fluids from one point to another. In such apparatus, it is necessary to provide a means for the expansion and contraction of the conduit caused by changes in temperature in order to avoid excessive distortion of the conduit. It is common practice to construct the conduit handling the hot or cold fluid to include a section in the form of a U-shaped expansion loop to permit the expansion and contraction of the pipe to deform the expansion loop and thereby avoid buckling and deformation of the conduit. However, it is apparent that since the expansion loop is deformed to some extent, the length of conduit forming the loop will be stressed and, if the conduit is handling very hot fluids, metallic creep results in a permanent deformation of the expansion loop. Further, as commonly happens, one leg of the U-shaped loop is often at a higher temperature than the other leg thereby resulting in a twisting action on the length of conduit connecting the two legs. Attempts have been made to avoid stressing such an expansion loop by inserting conventional expansion joints in the parallel legs of the loop but the result has been merely to transfer the stress from the conduit to the expansion joint with a resultant ultimate failure thereof.

It is also common in many processes of the prior art to shape a conduit in the form of a U or in a series of U's connected in serpentine manner and then to pass fluids through such a conduit to effect heat exchange between the fluids and any fluids, such as the atmosphere, outside of the conduit. Such a system can be considered to be a series of expansion loops connected together and, since the fluid changes in temperature as it passes through the U-shaped conduits, the temperature of the conduits will likewise vary from point to point thereby causing stresses to be exerted along its length. To effectively eliminate such stresses would solve a very difficult problem often encountered by the art.

It is an object of this invention to provide a conduit expansion loop which will not be subjected to any substantial expansion or contractual stresses even though one portion of the loop is at a different temperature than another portion of the loop.

It is an object of this invention to provide a deflection joint capable of preventing stresses from developing in a conduit handling hot or cold fluids.

It is another object of this invention to provide deflection joints adapted to permit lateral movement of the axis of a conduit without stressing the conduit.

Other objects and advantages of this invention will be apparent to one skilled in the art upon reading the specification and claims to this invention.

Figure 2:
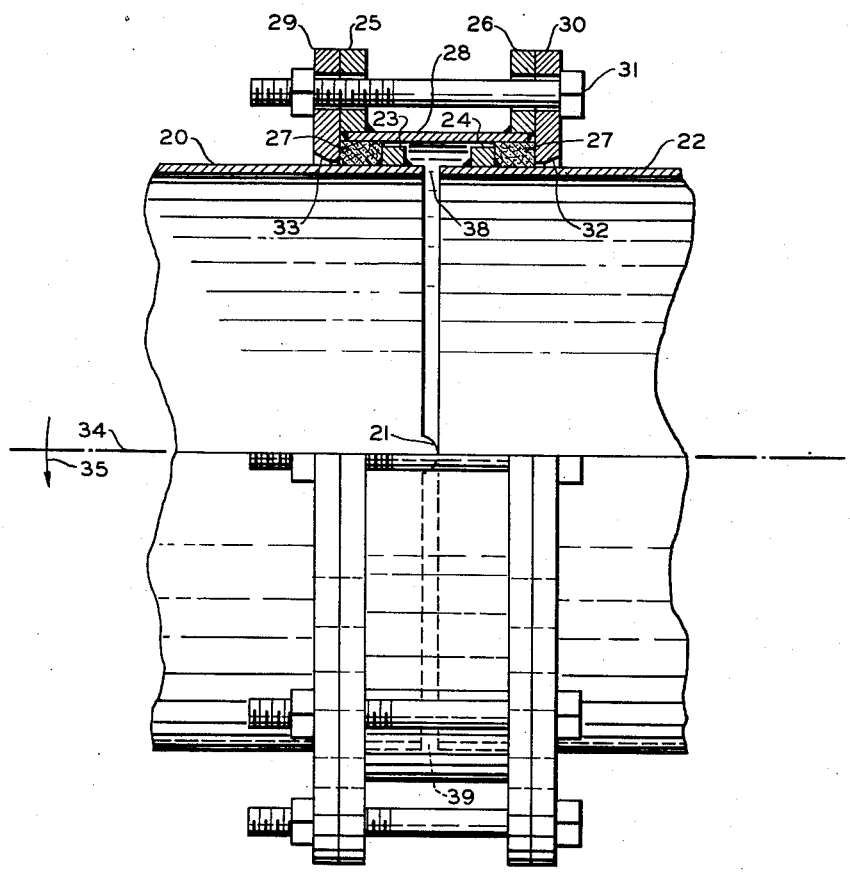

Referring to the attached drawings, Figure 1 represents schematically an apparatus for the manufacture of carbon black by the controlled oxidation of hydrocarbons and illustrates one particular use for the expansion loop of this invention. Figure 2 represents a partial cross-sectional view of a deflection joint particularly adapted to be employed in the expansion loop of Figure 1.

In Figure 1, carbon black furnace 3 is employed to oxidize hydrocarbons introduced therein via line 4 in order to produce carbon black. During the controlled oxidation of the hydrocarbons, carbon black is formed and is carried from the furnace 3 while suspended in hot flue gases through an inner conduit 5 in cooler 6 which is equipped with a cooling medium circulating jacket 7 having a cooling medium, such as water, introduced into it through line 8 and removed via line 9. Additional cooling medium can be sprayed through line 10 into line 5 where it acts as a quench for the flue gases and suspended carbon black passing therethrough. Generally, the gases and suspended carbon emerge from furnace 3 at a temperature in excess of 2000° F. and are cooled in cooler 6 at a temperature of about 1250° F.

The partially cooled flue gases and carbon black are then passed to an atmospheric cooler comprised of a U-shaped length of uninsulated conduit 11 wherein they are cooled to a temperature of about 650° F. by the time they reach conduit 12. From conduit 12, the gases and carbon black flow to various subsequent processing steps such as solid-gas separators, not pertinent to this invention.

Conduit 11 is constructed to form a U-shaped loop having legs 13 and 14 and connecting leg 15. It is apparent that since furnace 3 is in a fixed position and conduit 12 is likewise in a fixed position, then legs 13, 14 and 15 would be subjected to considerable expansional stress if no provision were made for relieving it. Thus, if legs 13, 14 and 15 are heated from room temperature to operating temperature, leg 13 will expand longitudinally more than leg 14 because it is raised to a higher average operating temperature than is leg 14 since the fluids passing through the loop are being cooled as they progress along the length of the conduit. Therefore, if no provision is made to avoid it, leg 15 will be displaced or twisted laterally to a position which is no longer at right angles to legs 13 and 14 because leg 13 has expanded longitudinally more than leg 14 thereby stressing leg 15, particularly at curved portions 16 and 17.

According to one aspect of this invention, there is provided an expansion loop comprising legs 13, 14 and 15 and having deflection joints 18 and 19 inserted therein. Deflection joints 18 and 19, more fully described hereinafter, permit leg 13 to freely expand or contract longitudinally more than leg 14, or vice versa, without causing any substantial stresses to develop in the legs 13 and 14 or in curved portions 16 and 17 or in leg 15. Thus, assuming for the purpose of illustration that leg 13 is parallel to leg 14 and that it will expand longitudinally more than leg 14 when the operating temperature of the expansion loop is reached and, further, that leg 15 is at right angles to legs 13 and 14 before the loop is heated to operation temperature, deflection joints 18 and 19 permit each of the ends of leg 15 to be displaced a different distance laterally in the plane of the loop without causing any substantial stresses to develop in the loop when it is heated to operating temperature. In the loop's expanded condition, legs 13 and 14 will remain parallel, for example, while leg 15 will be turned so that its longitudinal axis will no longer be in its original right angle position with respect to the longitudinal axes of legs 13 and 14. Hence, legs 13 and 14 are permitted to expand freely without exerting any twisting stresses on leg 15 or curved sections 17 and 18.

In Figure 2, the deflection joints of this invention are shown in a partial cross-sectional view. Conduit 20 is provided with two bearing shoulders 21 spaced 180° apart on the circumference of the end of the conduit. Conduit 22 is located coaxially with conduit 20 so that bearing shoulders 21 rest on its circumference to provide a pivot point which permits the longitudinal axis of at least one of conduits 20 and 22 to pivot laterally about a diameter drawn through the shoulders 21. Bearing shoulders 21 can be fashioned integrally with conduit 20 or can be fastened thereon in any suitable manner such as by welding.

Stop rings 23 and 24 are attached to conduits 20 and 22 at a point adjacent their abutting ends. Inner flanges 25 and 26 extend around conduits 20 and 22 and have their inner circumference spaced from the walls of conduits 20 and 22 to provide a packing space which can be filled with packing 27. Inner flanges 25 and 26 are spaced behind stop rings 23 and 24, respectively, as shown. Inner flanges 25 and 26 are attached at their inner circumferences to cylindrical spacing member 28 which extends between the inner flanges 25 and 26 in such a manner as to provide a suitable clearance with respect to stop rings 23 and 24. Thus inner flanges 25 and 26 and spacing member 28 provide a spacing spool adapted to extend around and over stop rings 23 and 24. Outer flanges 29 and 30 are provided to back up inner flanges 25 and 26 which have holes bored therethrough coincident with holes in flanges 29 and 30 to receive flange bolts 31. Outer flanges 29 and 30 can be beveled at 32 and 33 to permit at least one of conduits 20 and 22 to pivot about bearing shoulders 21 without binding against the flanges.

In setting forth the mode of operation of the deflection joint shown in Figure 2, assume that expansional stresses exerted on conduits 20 and 22 tend to cause the axis 34 of conduit 20 to deflect in the direction of arrow 35. In such case, conduit 20 merely pivots about bearing shoulders 21 thereby preventing any substantial stresses from occurring in the conduits. The resulting increase in distance between the ends of conduits 20 and 22 at point 38 and the corresponding decrease in distance at point 39 merely causes packing 27 to expand in the region adjacent to point 38 and to be compressed in the region adjacent to point 39. Thus, the movement of conduit 20 about bearing shoulders 21 does not result in any substantial leakage of fluids from the expansion joint.

When two of the deflection joints shown in Figure 2 are installed as deflection joints 18 and 19 of Figure 1 in such a manner that bearing shoulders 21 are in a plane at right angles to a plane through legs 13, 14 and 15, leg 13 will be permitted to expand freely and to a greater length than leg 14 or vice versa, without stressing leg 15 or curved portions 16 and 17 and without any danger of causing legs 13 and 14 to be excessively stressed, as stated hereinbefore.

Packing material 27 can be of any type suitable for use at the temperatures encountered in conduits 20 and 22. Preferably, the packing will be of sufficient density to substantially prevent escape of fluids therethrough and yet possess sufficient elasticity to be readily expansible in order to maintain a seal with respect to stop rings 23 and 24, spacing member 28 and inner flanges 25 and 26 whenever conduit 20 pivots about bearing shoulders 21. Asbestos rope, silicone impregnated asbestos, etc. are particularly suited for use at high temperatures. A metal seal can be substituted for packing 27 by forming it into a flexible configuration such as by corrugating it and then attaching it between spacing member 28 and conduits 20 and 22.

Bearing shoulders 21 should be of sufficient size to provide an adequate space between conduits 20 and 22 to permit conduit 20 to flex about its longitudinal axis without any contact between the ends at points 38 and 39. As a general rule, this space is dependent upon the amount of displacement of axis 34 of conduit 20 and can be readily calculated for any given installation. For example, it has been found that when leg 15 of Figure 1 is about 8 feet long between deflection joints 18 and 19, then 0.5 inch of space between the ends of conduits 20 and 22 of Figure 2 is satisfactory.

Referring to Figure 1, it is desirable to locate deflection joints 18 and 19 as near the ends of leg 15 as is possible. Thus deflection joints 18 and 19 should be as close to legs 13 and 14, respectively as curved sections 16 and 17 will permit. Location in such positions will permit a maximum difference in change in lengths between legs 13 and 14 with a minimum of pivoting of the respective conduits in the deflection joints. Lengthening of leg 15 will provide a like effect.

While the invention has been described in connection with a present, preferred embodiment thereof, it is to be understood that this description is illustrative only and is not intended to

I claim:

1. A deflection joint comprising a first conduit and a second conduit, two raised bearing shoulders spaced 180° apart on the circumference of the end of said first conduit and integral therewith, one end of said second conduit being planar and butted against said bearing shoulders of said first conduit for rotation of said second conduit about said bearing shoulders, an annular stop ring attached externally of each of said conduits adjacent opposing ends thereof, a pair of annular inner flanges each having an internal diameter larger than the external diameter of said conduits, said inner flanges each being spaced further from the opposing ends of said conduits than said stop rings, a cylindrical member having an inner diameter larger than the outer diameter of said stop rings, said spacing member being attached at each of its ends to one of said inner flanges, a pair of annular outer flanges each having an inner diameter slightly larger than the external diameter of said conduits, said outer flanges each being positioned adjacent one of said inner flanges to form packing spaces between said stop rings and said spacing member and said outer flanges, a plurality of bolts extending longitudinally through each of said inner and said outer flanges, and packing situated in said packing spaces.

2. The combination in accordance with claim 1 wherein said outer flanges each are beveled on the inner periphery thereof to allow rotation of said second conduit about said bearing shoulders.

3. A deflection joint comprising a first conduit and a second conduit, two raised bearing shoulders spaced 180° apart on the circumference of the end of said first conduit, one end of said second conduit being planar and butted against said bearing shoulders of said first conduit for rotation of said second conduit about said bearing shoulders, an annular stop ring attached externally of each of said conduits adjacent opposing ends thereof, a pair of annular inner flanges each having an inner diameter larger than the external diameter of said conduits, said inner flanges each being spaced further from the opposing ends of said conduits than said stop rings, a cylindrical spacing member having an inner diameter larger than the outer diameter of said stop rings and attached at each of its ends to one of said inner flanges, a pair of annular outer flanges each having an inner diameter slightly larger than the external diameter of said conduits, said outer flanges each being positioned adjacent one of said inner flanges to form a packing space between said stop rings and said spacing member and said outer flanges, and packing positioned in said packing space.

4. A deflection joint comprising a first conduit and a second conduit, two raised bearing shoulders on one end of said first conduit, one end of said second conduit being planar and butted against said bearing shoulders of said first conduit for rotation of said second conduit about said bearing shoulders, a stop ring attached to each of said conduits adjacent the opposing ends thereof, inner flanges spaced further from opposing ends of said conduits than said stop rings, a spacing member attached at each of its ends to one of said inner flanges, and outer flanges positioned adjacent said inner flanges to form a packing space between said stop rings and said spacing member and said outer flanges.

References Cited in the file of this patent

UNITED STATES PATENTS

| Number | Name | Date |
|---|---|---|
| 862,088 | Martin | July 30, 1907 |
| 1,897,215 | Russell | Feb. 14, 1933 |
| 1,940,729 | Pfefferle | Dec. 26, 1933 |
| 2,201,862 | Heisterkamp | May 21, 1940 |
| 2,230,468 | Pfefferle | Feb. 4, 1941 |
| 2,335,478 | Bergman | Nov. 30, 1943 |
| 2,354,416 | Phillips | July 25, 1944 |
| 2,460,032 | Risley | Jan. 25, 1949 |

FOREIGN PATENTS

| Number | Country | Date |
|---|---|---|
| 629,161 | Germany | Apr. 23, 1936 |